(12) United States Patent
Kim

(10) Patent No.: US 6,185,245 B1
(45) Date of Patent: Feb. 6, 2001

(54) SYNCHRONIZATION ACQUISITION APPARATUS AND METHOD THEREOF

(75) Inventor: Si-Hyeon Kim, Kyungsangbuk-Do (KR)

(73) Assignee: Hyundai Electronics Industries Co., Ltd., Ichon-shi (KR)

( * ) Notice: Under 35 U.S.C. 154(b), the term of this patent shall be extended for 0 days.

(21) Appl. No.: 09/479,883

(22) Filed: Jan. 10, 2000

(30) Foreign Application Priority Data

Jan. 15, 1999 (KR) .................................................. 99-1049

(51) Int. Cl.[7] .............................. H04B 15/00; H04K 1/00; H04L 27/00
(52) U.S. Cl. ............................ 375/149; 375/367; 370/342
(58) Field of Search .................................. 375/149, 150, 375/148, 367; 370/342

(56) References Cited

U.S. PATENT DOCUMENTS

| | | | |
|---|---|---|---|
| 5,440,597 | 8/1995 | Chung et al. | 375/200 |
| 5,642,377 * | 6/1997 | Chung et al. | 375/200 |
| 5,675,608 * | 10/1997 | Kim et al. | 375/208 |
| 5,898,665 * | 4/1999 | Sawahashi et al. | 370/342 |
| 5,970,084 * | 10/1999 | Honda | 375/200 |

* cited by examiner

Primary Examiner—Don N. Vo
Assistant Examiner—Phuong Phu
(74) Attorney, Agent, or Firm—Fleshner & Kim, LLP

(57) ABSTRACT

A synchronization acquisition apparatus and a method thereof are disclosed. The apparatus includes a local code generator coupled to a plurality of delayers, a plurality of multipliers commonly coupled between the delayers and a plurality of integrators, and a plurality of switches coupled between the multipliers of an integrator. The plurality of integrators are coupled to a detector that detects the maximum integrator output. A plurality of comparators form a feedback loop for obtaining a reliable signal level under any environment and implementing a quick synchronization acquisition without checking all PN code offsets.

17 Claims, 2 Drawing Sheets

SYNCHRONIZATION ACQUISITION APPARATUS AND METHOD THEREOF

BACKGROUND OF THE INVENTION

1. Field of the Invention

The present invention relates to an improved synchronization acquisition apparatus and an implementation a method thereof applicable for wireless communications systems, and more particularly, Code Division Multiple Access (CDMA) wireless telephones or receivers.

2. Background of the Related Art

A Double Dwell, Maximum Likelihood, Serial Sliding Acquisition (DDMLSSA) may be implemented by discrete circuit elements, or a software routine performed by a digital data processor such as a high-speed signal processor, or a combination of the circuit device and the software routine. FIG. 1 shows the DDMLSSA of the related art. The DDMLSSA is a part of a remote communication apparatus receiver such as a Code Division Multiple Access (CDMA) wireless phone in accordance with the mobile telephone station-base station compatibility standard of the TIA/EIA/IS-95(July, 1993), which is the dual mode wide band diffusion spectrum cellular system.

When a wireless telephone is energized, one or more guide channel (i.e., pilot channels) are received from one or more neighboring base stations. Each guide channel transmits a psuedorandom noise (PN) code sequence which differs in phase (e.g., offset of the GPS time) from the PN code sequences of other base stations of the system. The DDMLSSA synchronizes the local PN generator of the receiver to the PN sequence of the guide channel with a signal intensity that exceeds the noise level. While the DDMLSSA need not synchronize to the guide channel of the base station nearest to the receiver at the initial stage, it should synchronize to the guide channel having a sufficiently intense signal strength to initiate communication between the base station and the receiver.

A high frequency receiver 1 and a frequency demodulator 2 receive a PN code signal from the guide channel of more than one transmission base station BS. The DDMLSSA is also coupled to a controller such as a data processor 3, which may input an integration time and a predetermined threshold value. The data processor 3 reads the adaptively obtained threshold value, as discussed in further detail below.

The related art DDMLSSA also contains a multiplier 11, first and second integrators 13, 14, a local PN code generator 12, a first, second, third, fourth, fifth, sixth, and seventh comparison block 21, 22, 23, 24, 25, 25, 26, 27, a noise sample count index initialization and incrementing blocks 31, 33, local phase incrementing block 32, and first and second threshold value initialization block 34, 35.

In the related art DDMLSSA, the received PN code signal (including noise) is applied to the multiplier 11. The received PN code signal is then multiplied by the PN code outputted from the local PN generator 12 of the wireless phone. The multiplier 11 output is applied to the first integrator 13 and the second integrator 14. The first integrator 13 is a trial integrator having an integration period of $T_{D1}$, seconds, and an output Zi1 of that integrator 13 is transmitted to the first comparator 21.

The first comparator 21 performs an operation to compare the first integrator 13 output Zi1 with a first threshold value $(1-y)$ Z1 at time t. That first threshold value is a function of the maximum first integrator 13 output from past history until time (t-1), and provides a confidence interval greater than 50% for the relatively short correlation length. Initially, the first threshold value Z1 is set to '0', and y is between $\frac{1}{16}$ and $\frac{1}{8}$ for the present comparison.

When the first integrator 13 output Zi1 is greater than or equal to the first threshold value $(1-y)$ Z1, the fifth comparator 25 performs a test and updates the first threshold value Z1, as discussed in greater detail below. When the first integrator 13 output Zi1 is less than the first threshold value, the second comparator 22 performs an operation to compare the first integrator 13 output Zi1 with a threshold likelihood value Z1/2, which is less than the historical value of the output of the first integrator 13. The predetermined threshold value is 6 dB less than the maximum signal energy or the maximum likelihood threshold value Z1/2, plus or minus (x), where (x) varies between about 0 and 3 dB.

If the first integrator 13 output Zi1 is greater than or equal to the first threshold likelihood value $Z1/2 \pm X$ based on the test performed by the second comparator 22, the system resets the value of the noise sample count index m to 0 at the index initialization block 31. Next, the third comparator 23 compares the phase i of the locally generated code signal with q, where q is the total number PN phases to be searched in the PN space. Here, q represents the total number of PN chips in the code region and has a value of $2_{15}$, or 32,768 chips.

The third comparator 23 determines whether the signal is at the end portion of the PN code region. If the phase i has a different value from the total number of PN chips q, the phase i is incremented by the local phase incrementing block 32 and the PN code generator 12 is updated, and the interrelationship is checked again. If the locally generated phase i equals the total number of PN chips q in a third comparator 23, the acquisition process is terminated, as an exhaustive search of the PN code region has been conducted, and the correct PN code phase has been determined.

If the first integrator 13 output Zi is less than the first threshold likelihood value $Z1/2 \pm X$ based on the test performed by the second comparator 22, the noise sample count index m is incremented by a value of 1 by the index incrementing block 33. The resulting value of the noise sample index m is then compared with a threshold value M in the fourth comparator 24.

If the noise sample index m is greater than the threshold value M, the checking process of the acquisition process is terminated, as a correct PN code phase determination has been completed, the acquisition apparatus has obtained a proper signal, and a predetermined number of the noise samples has been evaluated. For example, a suitable threshold value M between about 70 and about 150 provides a detection probability that exceeds 90%.

If the noise sample index m is less than or equal to the threshold value M, the phase of the locally generated PN code signal is incremented by the local incrementing block 32, and the interrelationship is checked again. The entire acquisition operation is performed until the first integrator 13 output (1-y)Zi1 exceeds the first threshold value Z1 in the first comparator 21, for the relatively short correlation interval. The output Zi1 of the first integrator 13 is then compared with Z1 by a fifth comparator 25. If the value of the first integrator 13 output Zi1 exceeds the threshold value Z1, the first threshold value is updated to equal the current output value Zi1 of the first integrator 13 in the first threshold value initialization block 34.

If the output Zi1 of the first integrator 13 is smaller than the first threshold value Z1 based on the test performed by the fifth comparison block 25, the first threshold value Z1 is not updated. Since the initial value Z1 is set at '0', the initial comparison result of the first comparison block 21 is followed by the operation of the fifth comparator 25, and the value of the first threshold value Z1 is initialized to the first integrator 13 output Zi1 by the first threshold value initialization block 34.

Next, the integration (i.e., dwell) time is increased to $T_{D2}$ seconds without changing the locally generated PN code phase. The second dwell time provides a higher detection probability and a lower false alarm probability. The integration time of the second integrator 14 is equivalent to about 128 to 2,048 chips, preferably 128 chips (104 msec). The integration time of the second integrator 14 is selected to exceed the integration time of the first integrator 13.

The sixth comparator 26 determines whether the second integrator 14 output Zi2 exceeds the second threshold value Z2. If the second integrator 14 output Zi2 exceeds the second threshold value Z2, then the second threshold value initialization block 35 updates the second threshold value Z2 to equal the current output value Zi2 of the second integrator 14. Since the second threshold value initially equals '0', the result of the sixth comparison block leads to the operation of the second threshold value initialization block, where the second threshold value Z2 is set to the second integrator 14 output Zi2. Next, the index initialization block 31 sets the noise sample count index m to an initial value of '0'. The phase of the internally generated code signal is varied by the decimal unit of the chip at the local phase incrementing block 32, and the interrelationship is rechecked until the condition in the third comparison block 23 has been satisfied.

If the output Zi2 of the second integrator 14 is less than the second threshold value Z2 as determined by the test performed in the sixth comparison block, the seventh comparison block 27 compares the output value Zi2 of the second integrator 14 with the second threshold likelihood value Z2/2, which is smaller by about 6 dB than the energy level of the maximum signal. If the output value Zi2 of the second integrator 14 is greater than or equal to the second threshold likelihood value Z2/2, the index initialization block 31 resets the noise sample counter index m to equal '0', and the phase of the PN code signal is varied by the decimal unit of the chip in the local phase incrementing block 32, and the interrelationship is checked again.

If the output Zi2 of the second integrator 14 is less than the second threshold prediction value Z2/2, the index incrementing block 33 increments noise sample counter index m by a value of 1, and the fourth comparator 24 compares the index m with the threshold value M. If the noise sample index m is greater than the threshold value M, the acquisition apparatus terminates the acquisition process as discussed above. If the noise sample counter index m is less than or equal the threshold value M, the entire acquisition process is continuously performed, as described above.

When the acquisition process of the related art is performed in a noisy communication environment, the output of the first integrator 13 fluctuates rapidly. Accordingly, the second integrator 14 is frequently used. However, because the first integrator 13 increasingly discards the false PN phases, the second integrator 13 is used less frequently. Since the second integrator 14 has a longer dwell time, the acquisition time is decreased when the second integrator 14 is used less frequently.

In the index initialization block 31, the noise sample counter index m is set to equal '0', and the next locally generated PN code phase is set in the local phase incrementing block 32. As a result, once the first locally generated PN code phase of the PN code space has been sampled, the acquisition apparatus automatically self-initializes.

The input PN signal is serially correlated with all possible code positions of the locally generated PN code replica. Whenever the output of the first and second integrators 13,14 exceeds the first and second threshold values, Z1, Z2 a corresponding threshold value is updated. The above-described operation continues until the correlated output satisfies the acquisition process. After the acquisition process terminates, the correct PN alignment is selected as the local PN code phase position, which generates the maximum detection output.

However, as described above, the related art synchronization acquisition apparatus has various disadvantages. Synchronization acquisition speed and reliability are decreased because all the PN code offsets are checked, and there is substantial noise.

The above description of the related art is incorporated by reference herein where appropriate for appropriate teachings of additional or alternative details, features and/or technical background.

SUMMARY OF THE INVENTION

An object of the present invention is to provide a synchronization acquisition apparatus and an implementation method thereof that substantially obviates one or more of the problems caused by limitations and disadvantages of the related art.

Another object of the present invention is to provide a synchronization acquisition apparatus and a method thereof that obtains a reliable signal level in an environment where there is much noise and implements a quick synchronization acquisition without checking all PN code offsets.

To achieve the above objects, there is provided a synchronization acquisition apparatus which includes a PN code generator for generating a PN code signal by an initial PN code offset, a plurality of delay units for sequentially delaying the PN code signals, a plurality of multipliers for multiplying the received PN code signal and the PN code signals delayed by the delay units, a plurality of integrators for integrating the outputs of the multipliers over a first integration interval, a plurality of switches for selectively outputting one among the outputs of the multipliers, a variable integrator for varying an output of the multiplier selected by the switches, a detector for detecting a maximum value among the variable integrator and the integrators, a first comparator for comparing the maximum value detected by the detector and a first threshold value, a second comparator for comparing the maximum detected value and a first maximum value, a first block for updating the first maximum value among the values integrated over the first integration interval to the maximum detected value, a third comparator for comparing the maximum detected value and a first likelihood value, a second block for initializing the count, a fourth comparator for comparing the PN code offset and the PN code period, a third block for increasing the count, a fifth comparator for comparing the count and a post detection search time(PDT), a fourth block for increasing the PN code offset, a sixth comparator for comparing a second integration value integrated over the second integration interval and a second maximum value, a seventh comparator for comparing the second integration value and a second likelihood value, a fifth block for updating the second maximum value among the values integrated over the second integration interval to a second integration result value, and a plurality of switches for selectively outputting the output of the variable integrator to the detector or the sixth comparator.

To achieve the above objects, there is provided a synchronization acquisition method which includes the steps of a first step for delaying sequential code signals by a plurality of delay ratios, multiplying a received code signal by each of the delayed code signals, and integrating each of the multiplied code signals over a first integration interval; a second step of detecting the maximum value among the multiplied code signals integrated over the first integration interval; a third step of comparing the maximum detected value with a first threshold value; a fourth step of comparing the maximum detected value with a second threshold value when the maximum detected value is smaller than the first threshold value; a fifth step of initializing a first counter value when the maximum detected value is larger than or equal to a second threshold value, changing a first code delay with a second code delay when an end signal of the generated code signal is reached, repeating the first through fourth steps, increasing the counter value when the maximum detected value is smaller than the second threshold value, changing the first code delay with the second code delay when the counter value is smaller than the post detection search time (PDT), and the end signal of the generated code signal is not reached by comparing the counter value and the post detection search time and repeating the first step through the fourth step; a sixth step of comparing the maximum detected value and a third threshold value, when the maximum detected value is larger than or equal to the first threshold value, wherein the third threshold value is set equal to the maximum detected value when the maximum detected value is larger than the third threshold value; wherein the sixth step comprises; a seventh step of integrating a value obtained by multiplying the received code signal by a second delayed code signal, over a second integration interval; an eighth step of comparing the second integration value with a fourth threshold value; a ninth step of comparing the second integration value with a fifth threshold value when the second integration value is smaller than the fourth threshold value; and a tenth step of initializing the counter value when one of the second integration values is not less than the fifth threshold value, changing a current code delay with another code delay by adding a predetermined number to the current code delay when the end of the generated code signal is not reached and repeating the first through the fourth steps, increasing the counter value when the second integration value is smaller than the fifth threshold value, comparing the counter value and the PDT, completing the acquisition when the counter value is not less than the PDT as a result of the comparison, changing the current code delay with another code delay when the counter value is smaller than the post detection search time and repeating the fourth through tenth steps.

To achieve the above objects, there is provided an apparatus for detecting and acquiring reliable synchronization in a communications system, comprising: a plurality of multipliers that receive an input code signal; a local code generator coupled to the plurality of multipliers to provide a corresponding plurality of local codes from a set of local codes; a plurality of integrators, wherein each of the said integrators receives and concurrently integrates over a first integration interval an output from a corresponding one of the multipliers; a detector coupled to receive outputs of the integrators, wherein the detector outputs a maximum value of the integrator outputs corresponding to a selected one of the local codes; and a first comparator that compares the detector output with a first threshold value and selectively resets a first maximum value.

To achieve the above objects, there is also provided a method for detecting and acquiring reliable synchronization, comprising the steps of: multiplying a received code signal by a first group of codes generated from a set of codes; concurrently integrating the plurality of multiplication products over a first integration interval; detecting the maximum value of the integrated values that corresponds to a selected code of the first group; comparing the maximum detected value with a first threshold value; integrating the selected code over a second integration interval when the maximum detected value is greater than the first threshold value; and comparing the output of the second integration interval with a second maximum value.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
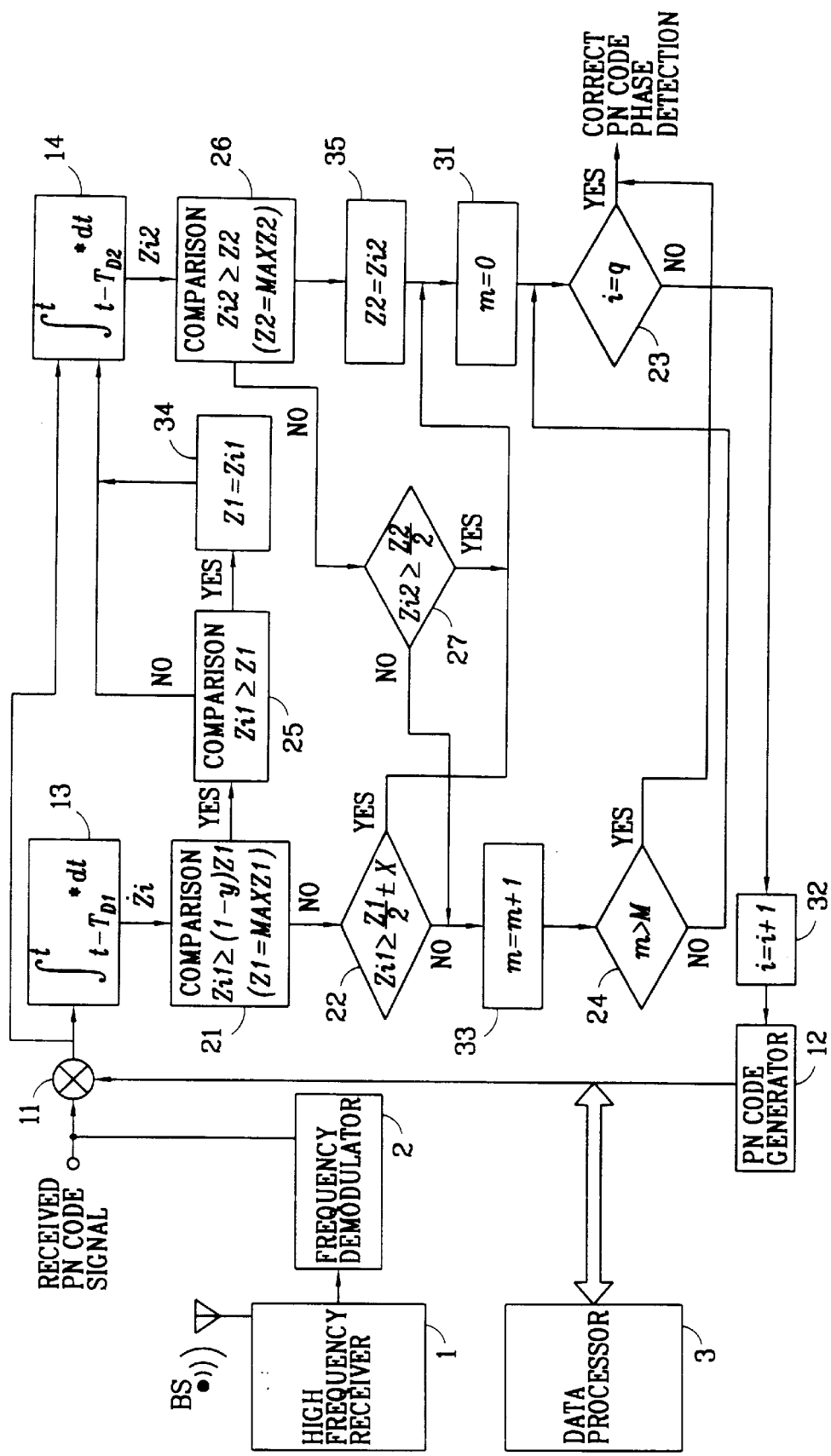
FIG. 1 is a block diagram illustrating a related art synchronization acquisition apparatus.
Figure 2:
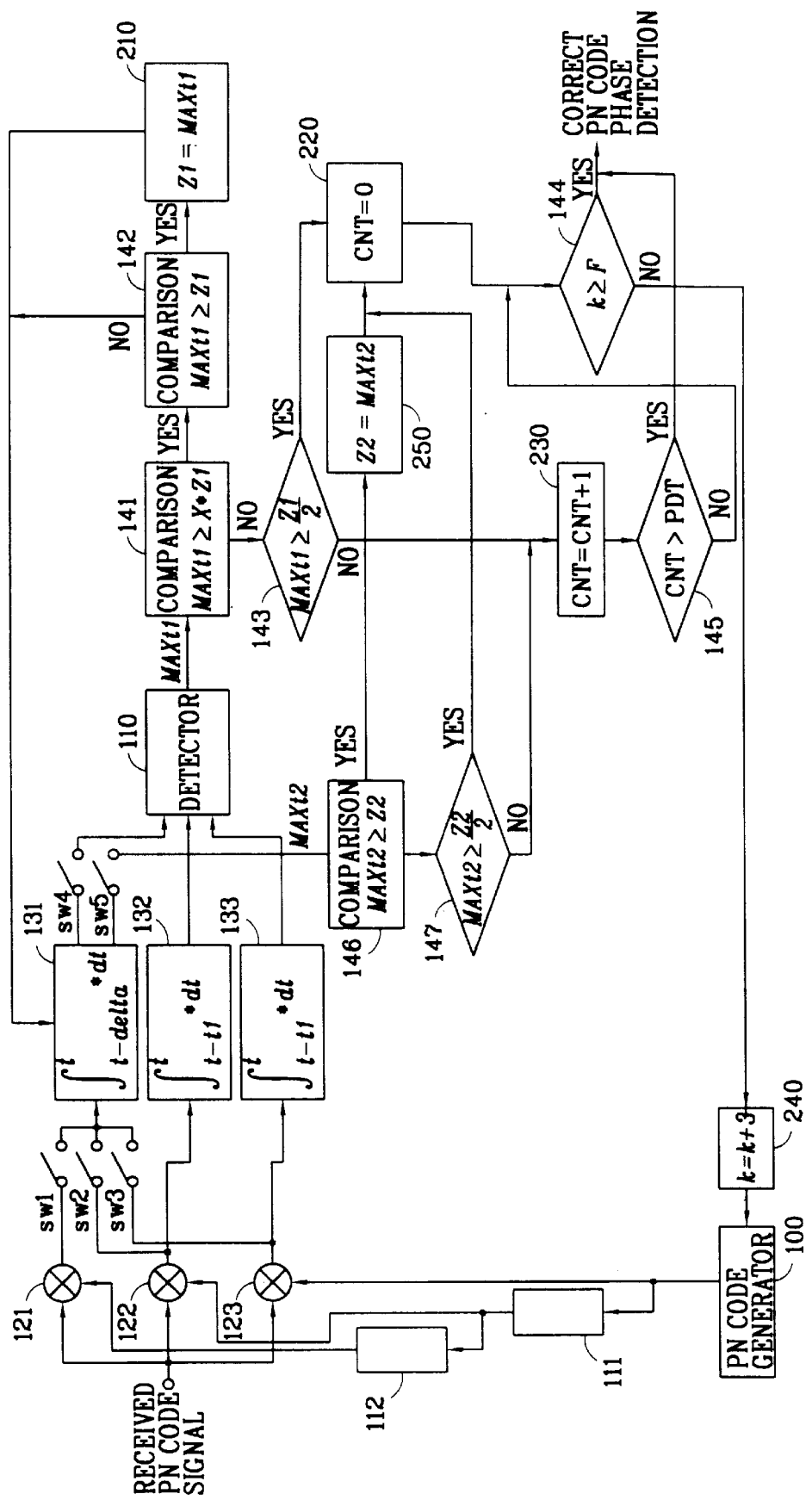
FIG. 2 is a block diagram illustrating a synchronization acquisition apparatus according to a preferred embodiment of the present invention.

FIG. 2 illustrates a preferred embodiment of a synchronization acquisition apparatus according to the present invention. The preferred embodiment of a synchronization acquisition apparatus includes a pair of integrators 132, 133 with identical integration intervals, and a variable integrator 131 that varies the integration interval to produce a synchronization acquisition time three times faster than the related art.

A PN input code signal (including noises) received by the synchronization acquisition apparatus is applied to first, second, and third multipliers 121, 122, 123. A first PN code signal from a PN code generator 100 is multiplied by a first delay PN code signal PNCSD1 and a second delay PN code signal PNCSD2 as first and second delay units 111, 112 sequentially delay the PN code signal. Since the PN code offset (K) of the PN code generator 100 equals 1 at an initial stage, the PN code generator 100 generates a PN code signal. The first and second delay units 111, 112 sequentially delay the locally generated PN code signal when the PN code offset (K) equals 1, such that first and second delay PN code signals are generated for PN code offset values (K) equal to 2 and 3, respectively The outputs of the second and third multipliers 122, 123 are applied to the second and third integrators 132, 133 having identical integration intervals. The outputs of the multipliers 121, 122, 123 are selectively applied to the variable integrator 131 by first, second and third switches SW1, SW2, SW3 for varying the integration interval. Initially, the first switch SW1 is transited to the "ON" position, so that the output of the first multiplier 121 is applied to the variable integrator 131. Additionally, the first 'delta' value of the variable integrator 131 is initially equals the integration value t1 of the second and third integrators 132, 133. As a result, the variable first integrator 131 and the non-variable second and third integrators 132, 133 integrate the outputs of the first through third multipliers 121, 122, 123 over an identical integration interval.

The output of the variable integrator 131 is selectively outputted to the detector 110 or the sixth comparator 146 based on the position of fourth and fifth switches SW4, SW5. Initially, the fourth switch SW4 is transited to the 'ON' position, and the output of the variable integrator 131 is applied to the detector 110.

The detector 110 selects a maximum value MAXt1 from the outputs of the integrators 131, 132, 133, which is outputted to a first comparator 141. The first comparator 141 then performs an operation to compare the output MAXt1 of the detector 110 with the first threshold value X*Z1. In the present embodiment, Z1 represents a first maximum value, which is the largest historical integration value, and X represents a value of about 0.85~0.94. If the output MAXt1 of the detector 110 is greater than or equal to the first threshold value X*Z1, the first maximum value Z1 is compared with the output MAXt1 of the detector 110 by a second comparator 142.

If the second comparator 142 determines that the maximum output MAXt1 of the detector 110 is greater than or equal to the first maximum value Z1, the first maximum value Z1 among the first integration values is updated to equal the output value MAXt1 of the detector 110 by the first threshold value initialization block 210. The second delta value t2 of the variable integrator 131 is updated for the second integration to a value greater than a first delta value. If the detector 110 maximum output value MAXt1 equals the output of the variable integrator 131, the first switch SW1 is transited to the 'ON' position. Correspondingly, the maximum output value MAXt1 equals the output of the second integrator 132, the second switch SW2 is transited to the 'ON' position, and if the maximum output value MAXt1 equals the output of the third integrator 133, the third switch SW3 is transited to the 'ON' position. If either the second switch SW2 or the third switch SW3 is in the 'ON' position, the fourth switch SW4 is transited to the 'OFF' position, and the fifth switch SW5 is transited to the 'ON' position.

If the output MAXt1 of the detector 110 is less than the first maximum value Z1 among the former first integration values, the first maximum value Z1 among the former first integration values is not updated to equal the maximum output MAXt1 value of the detector. The condition for the second integration is set as described above.

If the maximum value MAXt1 is less than the first threshold value X*Z1 based on the operation performed by the first comparator 141, a third comparator 143 compares the maximum output value MAXt1 with a first likelihood value Z1/2, which is less than the first maximum threshold value Z1. If the maximum output value MAXt1 is greater or equal to the first likelihood value Z1/2, the count CNT is set to 0 by a counter initialization block 220, and the PN code offset K and the PN code period F are compared by a fourth comparator 144. If the PN code offset K is less than the PN code period F, the PN code offset K is incremented by 3 by a local phase incrementing block 240, so the PN code generator 100 generates a PN code signal by the offset K.

The local phase incrementing block 240 increases the number added to the offset K by the number of integrators. In the preferred embodiment of synchronization acquisition apparatus according to the present invention, three integrators are used. If the PN code offset K is greater than the PN code period F, the PN code phase has been correctly determined, and the synchronization acquisition operation is terminated.

If the maximum output value MAXt1 is less than the first likelihood value Z1/2, a count incrementing block 230 increments the count CNT by a value of 1. The count CNT and a post detection search time (PDT) are compared by a fifth comparator 145. The post detection search (PDT) is the time required to evaluate the noise sample or non-related signals, based on the number determined by the synchronization apparatus after a reliable signal is obtained. A detection probability of about 99% is obtained based on the PDT. If the count CNT is less than or equal to the post detection search time PDT, the PN code offset K and the PN code period F are compared by the fourth comparator 144. If the count CNT is greater than the post detection search time PDT, the PN code phase has been correctly determined, and the synchronization acquisition operation is terminated.

When the variable integrator 131 integrates with respect to integration intervals determined by the second delta value based on the condition for the second integration, the fifth switch SW5 is transited to the 'ON' position and a second integration value MAXt2 of the variable integrator 131 is compared with a second maximum value Z2 by a sixth comparator 146. The second maximum value Z2 is the maximum value among the second integration values.

If the second integration value MAXt2 is greater than or equal to the second maximum value Z2, based on the operation of the sixth comparator 146, the second maximum value Z2 is updated to the second integration value MAXt2 by a second maximum value initialization block 250. The counter initialization block 220 resets the count CNT to a value of '0', and the fourth comparator 144 compares the PN code offset K and the PN code period F as discussed above. If the PN code offset K is less than the PN code period F, the local phase incrementing block 240 increments the PN code offset K by a value of 3, and the PN code generator 100 generates a PN code signal by the PN code offset K. If the PN code offset K is greater than the PN code period F, the PN code phase is correctly determined, and the synchronization acquisition operation is terminated.

If the second integration value MAXt2 is less than the second maximum value Z2 based on the operation of the sixth comparator 146, a seventh comparator 147 compares the second integration value MAXt2 to a second likelihood value Z2/2, which is less than the second maximum value Z2. If the second integration value MAXt2 is greater than or equal to the second likelihood value Z2/2, the count CNT is set to a value of 0 by the count initialization block 220. The PN code offset K and the PN code period F are compared by the fourth comparator 144 as described above. If the PN code offset K is less than the PN code period F, the local phase incrementing block 240 increases the PN code offset K by a value of 3, and the PN code generator 100 generates a PN code signal by the PN code offset K. If the PN code offset K is greater than the PN code period F, the PN code phase is correctly determined, and the synchronization acquisition operation is terminated.

If the second integration value MAXt2 is less than the second likelihood value Z2/2, the count CNT is incremented by a value of 1 by the count incrementing block 230, and the count CNT and the post detection search time PDT are compared by the fifth comparator 145 as described above. If the count CNT is less than or equal to the post detection search time PDT, the PN code offset K and the PN code period F are compared by the fourth comparator 144 as described above. If the count CNT is greater than the post detection search time PDT, the PN code phase is correctly determined, and the synchronization acquisition operation is terminated.

In the synchronization acquisition apparatus, the likelihood values are automatically determined in real time under an environment having a high noise level, for obtaining a reliable signal level. After the reliable signal is obtained, the synchronization acquisition process is terminated without a need to detect all remaining PN code offsets. Since a plurality of code offsets are concurrently searched, it is possible to implement a faster synchronization acquisition.

The foregoing embodiments are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An apparatus for detecting and acquiring reliable synchronization in a communications system, comprising:
   a plurality of multipliers that receive an input code signal;
   a local code generator coupled to the plurality of multipliers to provide a corresponding plurality of local codes from a set of local codes;
   a plurality of integrators, wherein each of the said integrators receives and concurrently integrates over a first integration interval an output from a corresponding one of the multipliers;
   a detector coupled to receive outputs of the integrators, wherein the detector outputs a maximum value of the integrator outputs corresponding to a selected one of the local codes; and
   a first comparator that compares the detector output with a first threshold value and selectively resets a first maximum value.

2. The apparatus of claim 1, further comprising a second comparator, wherein one of the plurality of integrators is a variable integrator, wherein when the detector output is greater than the first threshold value, the variable integrator integrates the selected local code over a second integration period, and wherein the second comparator compares the variable integrator output to a second threshold value to selectively reset a second maximum value.

3. The apparatus of claim 2, further comprising:
   a first counter;
   a third comparator that compares the detector output with a third threshold to selectively increment and reset the counter;
   a first termination unit coupled to the first counter that terminates synchronization of the input code signal when the first counter is greater than a prescribed level;
   a second counter that increments a number of generated local codes based on the number of integrators;
   a second termination unit coupled to the second counter that terminates synchronization when the second counter is equal to a number of local codes in the set of local codes,
   wherein the level code generator provides an additional corresponding plurality of local codes to the multipliers based on the output of the termination units.

4. The apparatus of claim 2, further comprising:
   a first assignment block that selectively updates the first maximum value to equal the detector output;
   a third comparator that compares the detector output with a first likelihood value;
   a second assignment block that initializes a counter value, wherein the counter value represents a number of consecutive noise signals detected;
   a fourth comparator that compares a current number of generated local codes with a total number of available local codes;
   a third assignment block that increments the counter value;
   a fifth comparator that compares the counter value with a post-detection search time (PDT);
   a fourth assignment block that increments the number of generated local codes by the number of said integrators;
   a sixth comparator that compares the variable integrator output determined over the second integration interval with a second likelihood value; and
   a fifth assignment block that selectively updates a second maximum value to the variable integrator output over the second integration interval.

5. The apparatus of claim 4, further comprising:
   a plurality of first switching devices coupled between the plurality of the multipliers and the integrators; and
   a plurality of second switching devices coupled between the integrators and one of the detector and the second comparator, to transmit the variable integrator output to one of the detector and the second comparators and to transmit the remaining integrator outputs to the detector.

6. The apparatus of claim 5, wherein:
   the first threshold value is a maximum of the multiplier outputs integrated over the first integration interval multiplied by a prescribed number;
   the first maximum value is the maximum of the values integrated over the first integration interval;
   the first likelihood value is less than the first maximum value;
   the second maximum value is the maximum of the multiplier outputs integrated over the second integration interval; and
   the second likelihood value is a value smaller than the second maximum value.

7. The apparatus of claim 6, wherein a reliable synchronization has been acquired when a post-detection search is satisfied because a prescribed number of consecutive outputs of the integrators are less than the first likelihood value.

8. The apparatus of claim 4, wherein the fourth assignment block increments the number of generated local codes by a number based on the number of integrators.

9. The apparatus of claim 1, wherein the synchronization has been acquired when the set of local codes has been completely compared or a predetermined number of consecutive local codes has been compared without the detector output being over a confidence threshold.

10. The apparatus of claim 1, wherein the first comparator further comprises a reset comparator that compares the detector output to the first maximum value and resets the first maximum value to be equal the detector output when the detector output is greater than the first threshold value and the first maximum value.

11. The apparatus of claim 1, wherein the local code generator further comprises a plurality of delay units, and wherein the corresponding plurality of local codes are concurrently received by each of the plurality of multipliers using the delay units.

12. The apparatus of claim 1, wherein at least one integrator is a variable integrator, and wherein at least two remaining integrators have equal integration intervals.

13. A method for detecting and acquiring reliable synchronization, comprising the steps of:

multiplying a received code signal by a first group of codes generated from a set of codes;

concurrently integrating the plurality of multiplication products over a first integration interval;

detecting the maximum value of the integrated values that corresponds to a selected code of the first group;

comparing the maximum detected value with a first threshold value;

integrating the selected code over a second integration interval when the maximum detected value is greater than the first threshold value; and comparing the output of the second integration interval with a second maximum value.

14. The method of claim 13, further comprising the steps of:

comparing the maximum detected value with a first maximum value when the maximum detected value is greater than or equal to the first threshold value;

assigning the maximum detected value to the first maximum value when the maximum detected value exceeds the first maximum value;

comparing the maximum integrated value with a first likelihood value when the maximum detected value is less than the first threshold value;

initializing a counter value when the maximum detected value is greater than or equal to the first likelihood value; and incrementing the counter when the maximum detected value is less than the first likelihood value.

15. The method of claim 14, further comprising the steps of:

assigning the second integration value to the second maximum value when the second integration value is greater-than or equal to the second maximum value;

comparing the second integration value with a second likelihood value when the second integration value is less than the second maximum value;

initializing the counter value when the second integration value is greater than or equal to the second likelihood value; and incrementing the counter value when the second integration value is less than the second likelihood value.

16. The method of claim 15, further comprising the steps of:

comparing the counter value with a post detection search time (PDT) when the counter value is incremented;

terminating the synchronization when the counter value is greater than the PDT; and terminating synchronization when all codes from the set of codes have been evaluated.

17. A synchronization acquisition method, comprising the steps of:

a first step of delaying sequential code signals by a plurality of delay ratios, multiplying a received code signal by each of the delayed code signals, and integrating each of the multiplied code signals over a first integration interval;

a second step of detecting a maximum value among the multiplied code signals integrated over the first integration interval;

a third step of comparing the maximum detected value with a first threshold value;

a fourth step of comparing the maximum detected value with a second threshold value when the maximum detected value is smaller than the first threshold value;

a fifth step of initializing a first counter value when the maximum detected value is larger than or equal to a second threshold value, changing a first code delay with a second code delay when an end signal of the generated code signal is reached, repeating the first through the fourth steps, increasing the counter value when the maximum detected value is smaller than the second threshold value, changing the first code delay with the second code delay when the counter value is smaller than a post detection search time (PDT), and the end signal of the generated code signal is not reached by comparing the counter value and the post detection search time, and repeating the first step through the fourth step;

a sixth step of comparing the maximum detected value and a third threshold value when the maximum detected value is larger than or equal to the first threshold value, wherein the third threshold value is set equal to the maximum detected value when the maximum detected value is larger than the third threshold value, wherein the sixth step comprises;

a seventh step of integrating a value obtained by multiplying the received code signal by a second delayed code signal, over a second integration interval;

an eighth step of comparing the second integration value with a fourth threshold value;

a ninth step of comparing the second integration value with a fifth threshold value when the second integration value is smaller than the fourth threshold value; and a tenth step of initializing the counter value when one of the second integration value is not less than the fifth threshold value and the second integration value is not smaller than the fourth threshold value, changing a current code delay with another code delay by adding a predetermined number to the current code delay when the end signal of the generated code signal is not reached and repeating the first through fourth steps, increasing the counter value when the second integration value is smaller than the fifth threshold value, comparing the counter value and the PDT, completing the acquisition when the counter value is not less than the PDT as a result of the comparison, changing the current code delay with another code delay by adding a predetermined number to the current code delay when the counter value is smaller than the post detection search time and repeating the fourth through tenth steps.

* * * * *